June 3, 1941.  L. S. WILLIAMS  2,244,587
MEASURING INSTRUMENT
Filed Oct. 10, 1939  3 Sheets-Sheet 1
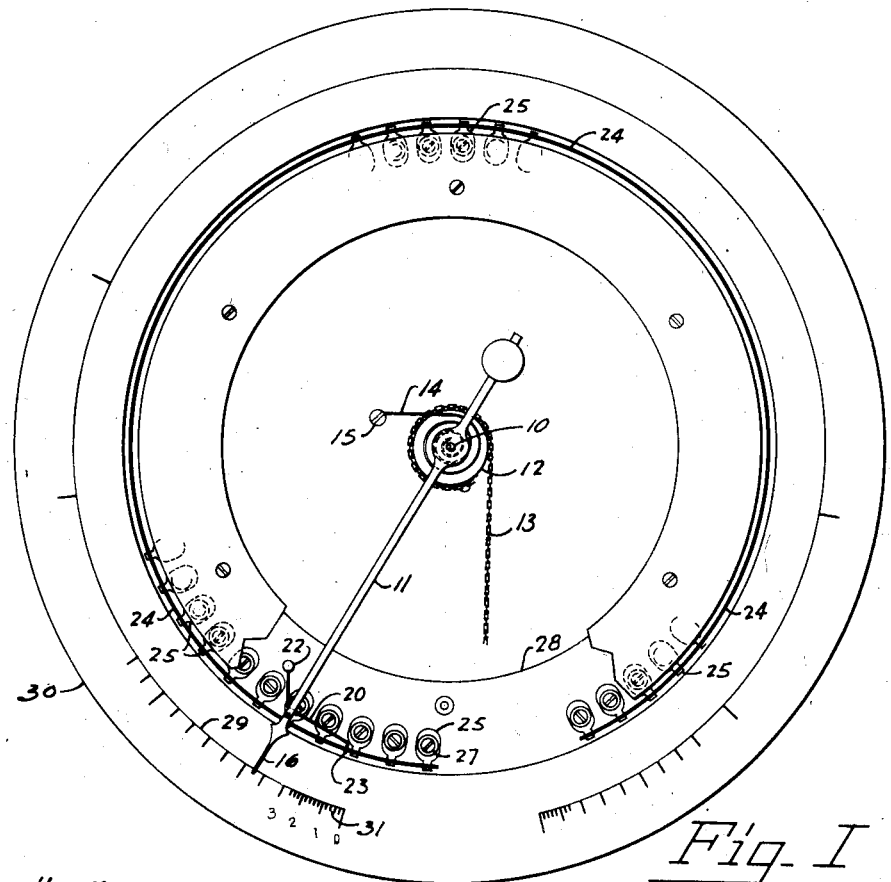
Fig. I
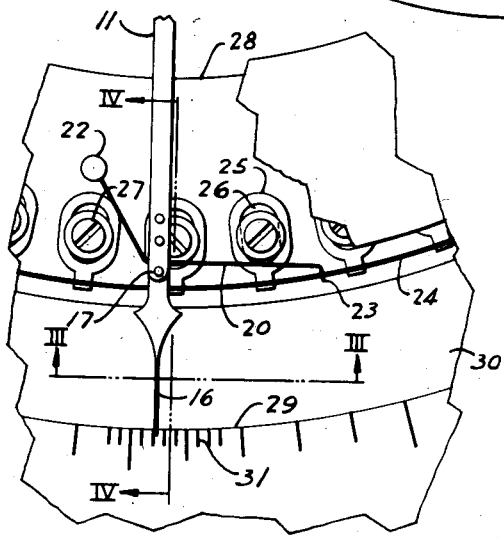
Fig. II
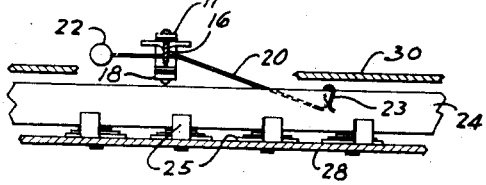
Fig. III
Lawrence S. Williams
INVENTOR
BY Marshall & Marshall
ATTORNEYS June 3, 1941.                L. S. WILLIAMS                2,244,587
                         MEASURING INSTRUMENT
                          Filed Oct. 10, 1939                3 Sheets-Sheet 2
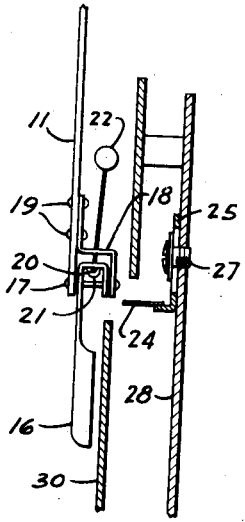
Fig. IV
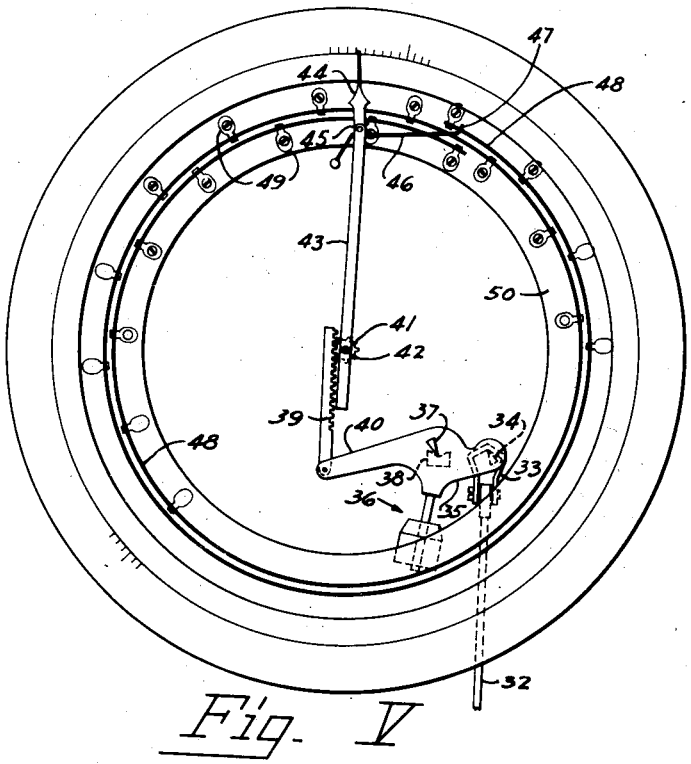
Fig. V
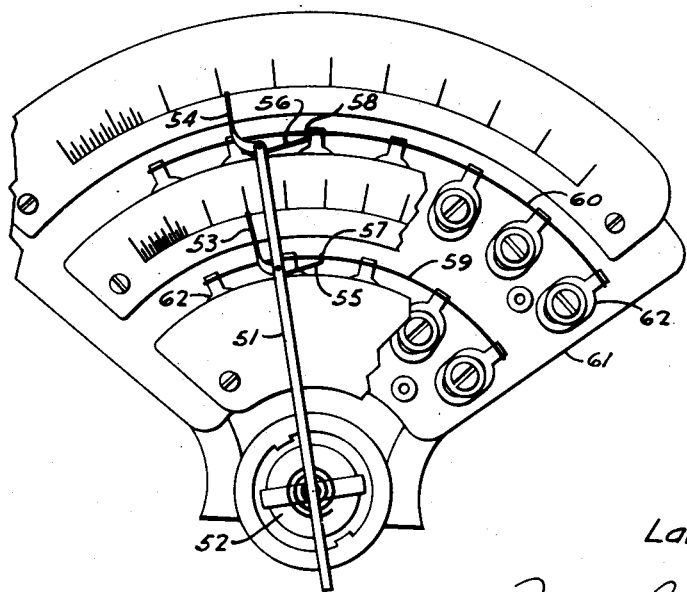
Fig. VI
Lawrence S. Williams
INVENTOR
BY Marshall & Marshall
ATTORNEYS June 3, 1941.　　　L. S. WILLIAMS　　　2,244,587
MEASURING INSTRUMENT
Filed Oct. 10, 1939　　　3 Sheets-Sheet 3
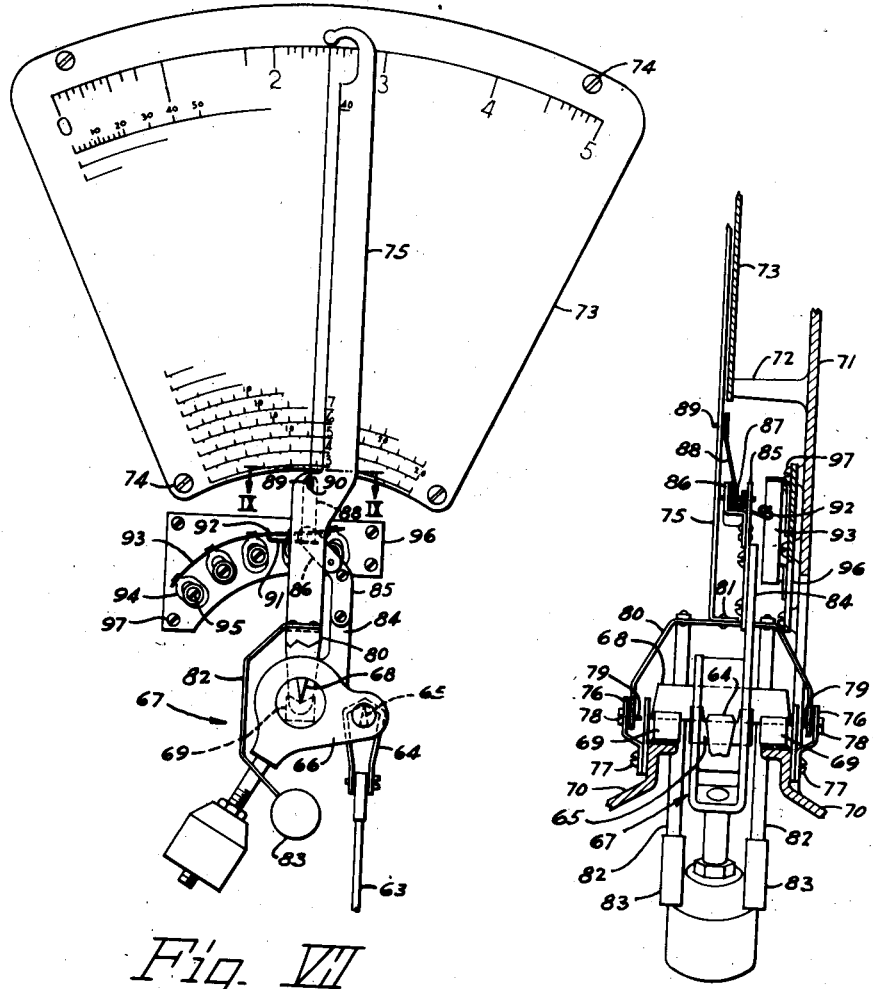
Lawrence S. Williams
INVENTOR
BY Marshall & Marshall
ATTORNEYS Patented June 3, 1941

2,244,587

UNITED STATES PATENT OFFICE 2,244,587

MEASURING INSTRUMENT

Lawrence S. Williams, Toledo, Ohio, assignor to Toledo Scale Company, a corporation of New Jersey Application October 10, 1939, Serial No. 298,810

12 Claims. (Cl. 73—51)

This invention relates generally to measuring instruments, and more particularly to corrective means in measuring instruments.

In many measuring instruments the indicating charts are printed on paper and although the paper is generally especially prepared and after printing coated with a transparent lacquer to prevent the absorption of moisture the short interval between the time of printing and the application of lacquer is frequently sufficient for it to absorb moisture. Since paper is very hygroscopic it also absorbs moisture while being stored in the stockroom before printing. This moisture dries out after printing even when the paper is coated with lacquer. Any change in the moisture content of paper has a tendency to cause errors in the position of the graduation lines which are printed from accurately engraved printing plates. Such errors in the position of the chart graduation in many cases cannot be compensated for in the adjustment of the instrument.

In another class of instruments the increments of travel of the indicator are unequal for equal increments of the force being measured. This requires unequally graduated charts thus greatly increasing the cost of the printing plates. Such instruments are also more difficult to read than those which are equally graduated.

Still another class of instruments exists in which the charts must be graduated in conformity with the characteristics of the instrument in which it is finally used. This requires that the charts be graduated by hand for each instrument. Since in the majority of cases the variations in the graduations of the charts and the variations in the travel increments of the indicator, due to the characteristics of the instrument, are very small they are often disregarded in the cheaper instruments and the graduation lines on the charts are made sufficiently wide so that the indicator appears to be in registration when a known force is being applied.

The principal object of this invention is the provision of improved means for obviating errors in measuring instrument indications.

Another object is the provision of improved means for converting varying indication increments of an indicator into increments of equal length; and, A still further object is the provision of a calibrating means stationed adjacent the chart for cooperation with the indicator.

These, and other objects and advantages will be apparent from the following description in which reference is had to the accompanying drawings, illustrating a preferred embodiment of the invention and in which similar reference numerals refer to similar parts throughout the several views.

In the drawings:

Fig. I is a fragmentary front elevational view illustrating the indicating means of a measuring instrument constructed according to the invention.

Fig. II is an enlarged fragmentary view of the indicator tip and the calibrating means.

Fig. III is a section taken substantially along the line III—III of Fig. II.

Fig. IV is an enlarged side elevational view in section, the section being along the line IV—IV of Fig. II.

Fig. V is a front elevational view of an instrument in which the indicator is adapted to rotate through more than 360°.

Fig. VI is a front elevational view showing an electrical measuring instrument having more than one measuring range.

Fig. VII is a fragmentary elevational view of a computing scale in which the unequal increments of pendulum travel are converted into equal increments of indicator travel.

Fig. VIII is an enlarged fragmentary side elevational view in section; and,

Fig. IX is a plan view sectioned substantially along the line IX—IX of Fig. VII.

Referring to the drawings in detail:

Secured to a shaft 10 (Fig. I), journaled in antifriction bearings (not shown), is an indicator 11. A cylindrical member 12, which is mounted upon the shaft 10, is connected by a flexible member 13 to the measuring mechanism (not shown). The torque of this measuring mechanism, transmitted through the flexible member 13, is resisted and counterbalanced by a hair spring 14, one end of which is fastened at 15 to a stationary part of the instrument and the other end, in the known manner, is attached to the shaft 10.

The indicator 11 is provided with an adjustable index 16 (Figures II and IV) having a substantially U-shaped lower end which is mounted upon a pintle 17 extending between the free end of the indicator 11 and a bracket 18 riveted to the indicator at 19. Fastened to the index 16, in the horizontally extending portion of the U, is a very light but comparatively rigid arm 20. The arm 20, which is preferably made of music wire, may be secured to the index in any convenient manner, for example, it may be clamped to the horizontal portion of the U by an ear 21 which is formed by the die when the index is blanked in the punch press. Care must be taken that the arm 20 has no movement relative to the index. One end of this arm 20 is provided with a small balance weight 22 and this end may be bent so that the index 16 is statically balanced about its pintle 17. The opposite end of this arm is formed into an open-ended loop 23 which straddles a calibrating strip 24 mounted at right angles to the longitudinal axis of the indicator. The calibrating strip 24 comprises a thin ribbon of stainless steel to which a plurality of formed angled clips 25 are fastened. One of the arms of each of the angle clips 25 is either riveted or preferably spot-welded to the strip 24. The other arms of these clips are provided with elongated holes 26, and this calibrating strip is clamped by means of screws 27 which project through the elongated holes 26 in the clips 25 to an annular plate 28 fastened to suitable framework (not shown) of the instrument directly in back of the indicator 11. This strip is assembled in the instrument so that it is concentric to a circularly arranged line 29 printed on a chart 30 located in back of and immediately adjacent the index 16. The circularly arranged line 29 forms the base of a series of graduations 31 and designating indicia therefor representing the values of the forces being measured.

In calibrating the instrument, a force of a known value is applied and the indicator, under the influence of the force, rotates through a corresponding angle and its index points to the corresponding graduation. If it is now found that upon application of such force the index 16 stops slightly short of the proper graduation in the series 31 the technician who is calibrating the instrument loosens the screw 27 retaining the angle clip 25, which is adjacent the point of contact of loop 23, on the arm 20 with the calibrating strip and moves this clip outwardly until the index points directly to the proper graduation. Moving this clip 25 outwardly throws the calibrating strip 24 slightly out of concentricity at this point and since the loop 23 follows the periphery of this calibrating strip the arm 20 turns the index 16 about its pintle. Conversely if the index upon the application of the standard force comes to rest beyond the graduation the technician moves the clip 25 towards the center, when the index is directly in coincidence with the proper graduation the screw 27 is again tightened. The same procedure is followed upon the application of other standard forces through the entire measuring capacity of the instrument.

Fig. V illustrates the invention as applied to a weighing scale in which the counterbalancing pendulum is connected to the other scale mechanism by a stirrup pivotally engaging a pivot in an arm of the pendulum. This construction results in unequal graduations on the chart for equal increments of force as is well known. The force resulting from a load being applied to the scale platform (not shown) is transmitted through a rod 32, stirrup 33, to a pivot 34 stationed in a laterally extending arm 35 of load counterbalancing pendulum 36, which, by means of its fulcrum pivot 37, is supported upon suitable bearings 38 in the interior of the scale. Teeth of a rack 39, which is pivotally mounted on an arm 40 also projecting laterally from the pendulum but on the opposite side of the arm 35, engage teeth of a pinion 41 fixed on a shaft 42, whose ends are mounted in antifriction bearings (not shown). An indicator 43 is securely fastened to the shaft 42 so that it rotates when the shaft is turned. To the upper end of this indicator an index 44 is mounted upon a pintle 45 and an arm 46, constructed of music wire, has its free end bent into an open-ended loop 47 which straddles a calibrating strip 48. The construction of the arm 46, the index 44 and the manner of mounting the same upon the indicator 43 is substantially the same as described in the previous example as illustrated in Fig. IV. Since, in this example, the indicator is adapted to revolve through an angle greater than 360°, clips 49, identical in construction to the clips 25 in the previous example, are secured to the calibrating strip 48 in such a manner that some of them extend on one side of this strip and the others on the other side so that this strip may be assembled to a plate 50 in the form of a spiral. Since the calibrating strip 48 is spirally assembled to the plate 50 the longitudinal axis through the index 44 will not be parallel to the longitudinal axis of the indicator 43 in the initial position, but will be parallel after the indicator has revolved through exactly one-half of the number of degrees of the total rotation and then again become angularly disposed but in the opposite direction. To effect correction, the calibrating strip is adjusted in exactly the same manner as described in the previous example and, therefore, requires no further description.

The device shown in Fig. VI is an electrical measuring instrument having two measuring ranges. An indicator 51 attached to an armature 52 is provided with two indexes 53 and 54 which perform the same function and are mounted substantially in the same manner as in the first example. Arms 55, 56 provided with open-ended loops 57 and 58 engage calibrating strips 59 and 60 respectively. These calibrating strips are secured to a plate 61 in the same manner by means of clips 62. The manner of adjusting the calibrating strip is also performed in the same way so that this requires no further description.

Figures VII, VIII and IX illustrate weighing and indicating mechanism of a computing scale in which a chart, in addition to the weight indicating column, bears a table of computed values for a number of different unit prices. The embodiment of the invention in this device differs only from the foregoing examples in that the movement of the entire indicator is influenced by the calibrating strip and in that the indicator is fulcrumed independently of the pendulum.

Force resulting from a load placed on the load receiver of the scale is transmitted through a connecting rod 63, a stirrup 64 to a pivot 65 mounted in laterally extending arms 66 of a load counterbalancing pendulum 67 which is fulcrumed by means of a pivot 68 and suitable V bearings 69 on a frame 70. An upwardly extending extension 71 of the frame 70 is provided with forwardly extending bosses 72 to which a chart 73 is fastened by means of screws 74. For the purpose of supporting an indicator 75, Z-shaped brackets 76 are fastened to the frame 70 by means of screws 77 in a vertical plane passing through the apex of the V of the bearing 69 and immediately below it. Screws 78, having tenons 79, are threaded through the Z-shaped brackets in such a position that these tenons are positioned in coincidence with the turning axis of the pivot 68 and form fulcrums for a yoke 80 upon which the indicator 75 is riveted as at 81. To statically balance the indicator 75, as well as the yoke 80 to which it is riveted about its fulcrum axis, a pair of dependingly bent arms 82, whose lower ends are provided with counterweights 83, are riveted to the yoke so that the weights 83 straddle the pendulum. To an arm 84, extending upwardly from the pendulum, is riveted an extension 85 and to this extension is riveted a Z-shaped member 86, the upper ends of the members 85 and 86 forming a U-shaped bracket, the arms of which support a pintle 87 upon which an indicator actuating arm 88 is pivotally mounted. This indicator actuating arm has a U-shaped lower end and is provided with a laterally extending pin 89 near its upper end and this pin projects through an elongated slot 90 in the indicator 75. Securely riveted, or otherwise fastened in the bottom of the U is an arm 91, formed of music wire, having an open looped end 92 which straddles a calibrating strip 93 riveted to angle clips 94 which are bolted by means of screws 95 to a plate 96 which in turn is fastened by means of screws 97 to suitable bosses projecting inwardly from the extension of the frame 71. The calibrating strip 93 is fastened to the plate 96 in a manner which is empirically determined so that the music wire arm 91 in moving along the contour of the calibrating ribbon, through the operating arm 88, influences the indicator 75 to move through equal space increments for equal weight increments placed on the scale. Although the arm 84 of the pendulum 67 partakes of the unequal angle movement of the pendulum the method of influencing the indicator travel and the method of adjusting the calibrating strip is similar to the one described in the first example and, therefore, requires no further description.

Having described the invention, I claim:

1. In a device of the class described, in combination, force counterbalancing means, indicating means operatively connected to and actuated by said force counterbalancing means, an indicia bearing chart for cooperation with said indicating means to indicate a numerical value of such force being counterbalanced, a deformable member, said indicating means comprising an indicator, an index pivotally mounted on said indicator and means fixedly secured to said index and cooperating with said deformable member for causing movement of said index auxiliary to the movement of said indicator.

2. In a device of the class described, in combination, force counterbalancing means, indicating means operatively connected to and actuated by said force counterbalancing means, an indicia bearing chart for cooperation with said indicating means to indicate a numerical value of such force being counterbalanced, a flexible metallic ribbon, means for flexing portions of said ribbon independently of other portions thereof, said indicating means comprising an indicator, means for supporting a pintle secured to said indicator, an index pivotally mounted upon said pintle, means fixedly secured to said index and cooperating with said deformable member for causing movement of said index auxiliary to the movement of said indicator and means for statically balancing said index about its pivot on said indicator.

3. In a device of the class described, in combination, force counterbalancing means, indicating means operatively connected to and actuated by said force counterbalancing means, an indicia bearing chart for cooperation with said indicating means to indicate a numerical value of such force being counterbalanced, a flexible metallic ribbon, means for flexing portions of said ribbon independently of other portions thereof, said indicating means comprising an indicator, an index pivotally mounted on said indicator and means fixedly secured to said index and cooperating with said flexible metallic ribbon for causing movement of said index auxiliary to the movement of said indicator and said means for flexing such portions of said ribbon comprising angle clips, each having one leg thereof fixedly secured to said ribbon and its other leg adjustably secured to a stationary part of the device.

4. In a device of the class described, in combination, force counterbalancing means, indicating means actuated by said force counterbalancing means, a circular chart, said chart having a circular row of indicia for cooperation with said indicating means to indicate numerical values of such force being counterbalanced, said indicating means comprising an indicator, an index pivotally mounted on said indicator, said indicating means being adapted for rotation through an angle greater than 360°, a deformable member comprising a flexible metallic ribbon spirally mounted adjacent said chart and substantially concentric with said circular row of graduations, means for deforming portions of said flexible metallic ribbon independently of other portions thereof and a laterally extending arm secured to said index for sliding engagement with said spirally mounted flexible ribbon whereby said index is moved auxiliary to the movement of said indicator in response to such deformations of said flexible metallic ribbon.

5. In a device of the class described, in combination, force counterbalancing means, indicating means operatively connected to and actuated by said force counterbalancing means, a chart bearing a plurality of concentric indicia rows for cooperation with said indicating means to indicate numerical values of such force being counterbalanced, a flexible metallic ribbon mounted adjacent to and substantially concentric with each of said plurality of indicia bearing rows, means for deforming portions of said flexible metallic ribbons independently of other portions thereof, said indicating means comprising an indicator and an index for each of said plurality of indicia bearing rows pivotally mounted on said indicator and each of said indexes having a substantially laterally extending arm for engagement with one of said flexible metallic ribbons for influencing the rate of movement of each of said indexes auxiliary to the rate of movement of said indicator.

6. In a device of the class described, in combination, an indicator, means for causing major movement of said indicator corresponding approximately to values to be indicated and means for causing minor corrective variations in such major movements, comprising an elongated deformable member, a movement varying member engaged therewith, said elongated deformable member and said movement varying member having relative movement during major movements of said indicator and said movement varying member acting in response to deformations of said elongated deformable member to cause minor corrective variations in such major movements of said indicator.

7. A device according to claim 6, in which said deformable member comprises a flexible metallic ribbon.

8. In a measuring instrument, in combination, a frame, means for counterbalancing a force, a relatively movable means for indicating such force operatively connected to said counterbalancing means, means including a deformable member for influencing such relative movement, said relatively movable indicating means comprising a rotary indicator, a stationary chart secured to said frame, said chart bearing a curved baseline, a series of graduations radiating from said base line, said deformable member comprising a thin metallic ribbon positioned to extend laterally to the plane of said chart and in concentricity to said base line thereon, a plate-like member extending parallelly to and in back of said chart, a plurality of angle clips secured to said metallic ribbon and to said plate-like member, means rigidly secured to said rotatable indicator for slidingly engaging said metallic ribbon, and means for adjusting the position of one or more of said plurality of angle clips whereby portions of said deformable member may be positioned eccentrically to said base line on said chart so that said means rigidly secured to said indicator and slidingly engaging said deformable member influences the rate of rotation of said indicator.

9. In a device of the class described, in combination, force counterbalancing means, indicating means movable by said force counterbalancing means, a chart bearing a series of indicia, said indicating means being movable along said series of indicia for indicating the magnitude of forces counterbalanced by said force counterbalancing means, a strip-like deformable member lying substantially along said series of indicia on said chart, and means cooperating with both said indicating means and said strip-like deformable member for influencing such movement of said indicating means auxiliary to the movement imparted by said force counterbalancing means.

10. In a device of the class described, in combination, force counterbalancing means, indicating means operatively connected to and actuated by said force counterbalancing means, an indicia bearing chart for cooperation with said indicating means to indicate a numerical value of force being counterbalanced, a ribbon-like deformable member, said indicating means comprising an indicator, an index pivotally mounted on said indicator, and means fixedly secured to said index and cooperating with said ribbon-like deformable member for causing movement of said index auxiliary to the movement of said indicator, said means fixedly secured to said index for cooperation with said ribbon-like deformable member comprising a substantially laterally extending arm having a substantially slot-like opening in its free end for receiving said ribbon-like deformable member.

11. In a device of the class described, in combination, condition responsive mechanism, a chart, an indicator adapted to be actuated by said condition responsive mechanism, an index pivotally secured to said indicator, a deformable member adjustably secured to said chart, and means rigidly secured to said index and slidingly engaging said deformable member whereby the position of said index at all times is determined by the action of said condition responsive mechanism and by the influence of said deformable member.

12. In a device of the class described, in combination, force counterbalancing means, a pivotally mounted member actuated by said force counterbalancing means, an index pivotally mounted on said member actuated by said force counterbalancing means, a deformable member, an extending arm fixed to said index, and means on said arm for engaging said deformable member whereby deformed portions of said deformable member are adapted to rock said index about its pivotal mounting on said member actuated by said force counterbalancing means.

LAWRENCE S. WILLIAMS.